United States Patent [19]

Cribbs

[11] 3,714,630

[45] Jan. 30, 1973

[54] CHARACTER RECOGNITION METHOD AND SYSTEM WITH LEADING/TRAILING EDGE CONTROL

[75] Inventor: John A. Cribbs, Atlanta, Ga.

[73] Assignee: Data Card Corporation, Minneapolis, Minn.

[22] Filed: March 26, 1971

[21] Appl. No.: 128,380

[52] U.S. Cl. ....................340/146.3 J

[51] Int. Cl. ....................G06k 9/06

[58] Field of Search ......340/146.3, 146.3 C, 146.3 J, 340/146.3 Z, 146.3 AH

[56] References Cited

UNITED STATES PATENTS

| | | | |
|---|---|---|---|
| 3,531,770 | 9/1970 | Mauch et al. | 340/146.3 AH |
| 3,293,604 | 12/1966 | Klein et al | 340/146.3 J |

*Primary Examiner*—Maynard R. Wilbur
*Assistant Examiner*—Leo H. Boudreau
*Attorney*—Brufsky, Staas, Breiner & Halsey

[57] ABSTRACT

A character recognition method and system performs dynamic analysis of information derived in scanning characters for character recognition. A linear array of plural scanning elements scans characters to be recognized in a corresponding plurality of horizontal scan paths. Each element produces an output responsive to and identifying the presence or absence of a character segment in its corresponding scan path. One or more successive sets of conditions result in scanning of each character in accordance with a change in the output condition of any element. Character recognition is performed in accordance with the detection of a prescribed sequence of preselected sets of leading, of central, and of trailing edge conditions uniquely related to each character of the plurality of characters to be recognized. Each of the leading edge, central, and trailing edge conditions derived from the scanning are stored and subjected to further processing for the recognition function in accordance with timing controls which assure that the output conditions of all scanning elements have been accurately determined before the logic decision circuitry identifies the set of conditions represented thereby. Further logic decision means requires that a valid leading edge condition is detected, before the central and trailing edge conditions are processed, in scanning each character. In addition to the sequentially enabled processing and timing control functions, selection of the leading edge, central, and trailing edge sets of conditions also serves to eliminate potential errors in the recognition functions resultant from modifications of the character configurations for aesthetic appeal, as well as from imperfections therein and misalignment thereof as occur in practical applications.

21 Claims, 18 Drawing Figures

INVENTOR
JOHN A. CRIBBS

BY Brufsky, Staas, Breiner & Halsey
ATTORNEYS

| | SCANNED SETS OF CONDITIONS | | | | |
|---|---|---|---|---|---|
| | 1 | 2 | 3 | 4 | 5 |
| 0 | $ABCDE$ | $A\bar{B}\bar{C}\bar{D}E$ | $ABCDE$ | — | — |
| 1 | $\bar{A}\bar{B}\bar{C}\bar{D}E$ | $ABCDE$ | $A\bar{B}\bar{C}\bar{D}E$ | $\bar{A}\bar{B}\bar{C}\bar{D}E$ | — |
| 2 | $ABC\bar{D}E$ | $A\bar{B}C\bar{D}E$ | $A\bar{B}CDE$ | — | — |
| 3 | $ABCDE$ | $A\bar{B}C\bar{D}E$ | $A\bar{B}\bar{C}\bar{D}E$ | — | — |
| 4 | $\bar{A}\bar{B}C\bar{D}\bar{E}$ | $ABCDE$ | $\bar{A}\bar{B}C\bar{D}\bar{E}$ | $ABC\bar{D}\bar{E}$ | — |
| 5 | $A\bar{B}CDE$ | $A\bar{B}C\bar{D}E$ | $ABC\bar{D}E$ | — | — |
| 6 | $\bar{A}\bar{B}CDE$ | $\bar{A}\bar{B}C\bar{D}E$ | $ABCDE$ | — | — |
| 7 | $ABCDE$ | $A\bar{B}\bar{C}\bar{D}\bar{E}$ | — | — | — |
| 8 | $AB\bar{C}DE$ | $ABCDE$ | $A\bar{B}C\bar{D}E$ | $ABCDE$ | $AB\bar{C}DE$ |
| 9 | $ABCDE$ | $A\bar{B}C\bar{D}\bar{E}$ | $ABC\bar{D}\bar{E}$ | — | — |

FIG. 6

| | SELECTED SETS OF CONDITIONS | | |
|---|---|---|---|
| | LEADING EDGE (L) | CENTRAL CONDITION (C) $\bar{B}\bar{D}$ AND | TRAILING EDGE (F) |
| 0 | BD (1) | $A\bar{C}E$ (2) | BD (3) |
| 1 | BD (2) | $\bar{A}\bar{C}E$ (4) | $\bar{B}\bar{D}$ (-) |
| 2 | $B\bar{D}$ (1) | ACE (2) | $\bar{B}D$ (3) |
| 3 | BD (1) | ACE (2) | $\bar{B}\bar{D}$ (3) |
| 4 | BD (2) | $\bar{A}C\bar{E}$ (3) | $B\bar{D}$ (4) |
| 5 | $\bar{B}D$ (1) | ACE (2) | $B\bar{D}$ (3) |
| 6 | $\bar{B}D$ (1) | $\bar{A}CE$ (2) | BD (3) |
| 7 | BD (1) | $A\bar{C}\bar{E}$ (2) | $\bar{B}\bar{D}$ (-) |
| 8 | BD (1-2) | ACE (3) | BD (4-5) |
| 9 | BD (1) | $AC\bar{E}$ (2) | $B\bar{D}$ (3) |

CHARACTER INDEX : $\bar{A}\ \bar{B}\ \bar{C}\ \bar{D}\ \bar{E}$

FIG. 7

CHARACTER RECOGNITION METHOD AND SYSTEM WITH LEADING/TRAILING EDGE CONTROL

BACKGROUND OF THE INVENTION

1. Field of the Invention

This invention relates to automatic character recognition methods and systems and, more particularly, to a method and system wherein character information derived in scanning a character is dynamically analyzed by decoding and logic circuitry for identification of the scanned character.

2. State of the Prior Art

Numerous systems and methods have been proposed heretofore for the automated recognition of characters of both machine readable and visually recognizable types. Many prior art systems require obtaining data relating to the entire configuration of an unknown character which is stored and subsequently processed for ultimate identification of the character. For example, some prior art systems provide for optically projecting an image of the unknown character onto a mosaic, or matrix array, of sensing devices such as photocells. The output of the array of sensors is then compared with a plurality of matrices corresponding to known characters and each having stored therein a recognition pattern. A match between the output of the sensor array, responsive to the image of the unknown character, and the stored information of one of the matrices then provides character recognition. Such techniques require accurate alignment of the image of the unknown character on the sensor array if recognition is to be achieved. Various shadow mask comparison techniques are also known which operate on a similar principle.

Another technique that has been proposed heretofore is that of curve tracing, such as with a flying spot scanner cathode ray tube which operates essentially to trace the configuration of the character. Data relating to line lengths, curves or discontinuities, e.g., angles and intersections and the like in the scanned character, is derived and compared with stored, similarly derived data for known characters for identification.

Various complex digital processing techniques also have been proposed for performing a closely analogous function. In these, a plurality of scanning elements which may be disposed, for example, in a linear array, are caused to scan an unknown character in a predetermined direction. The outputs of the elements are gated into various storage registers as the scan proceeds, in accordance with predetermined time intervals. Such systems require complex processing circuitry for comparing signals from the various scanning elements with one another to identify continuous or discontinuous lines and intersections and the like.

Another technique proposed heretofore in the art is that of scanning the unknown characters, such as with a linear array of scanning elements, and simply counting certain predetermined events or characteristics which occur during the scan, for example, each time a line of scan intersects a segment of the character. Some such systems distinguish between intersections of long duration and ones of shorter duration and define corresponding, separate counts. The counts thus accumulated may simply be compared with stored such signals corresponding to known characters for achieving the identification, or recognition, of the unknown character. Alternatively, the counts may be subjected to further processing, or utilized as a control function such as in generating a digital pulse train, which then is further processed for ultimate analysis or comparison operations in achieving character recognition.

The prior art systems heretofore have all suffered from one or more of various defects. Many systems are exceedingly complex and correspondingly excessively expensive, while others, less complex and less expensive, afford inadequate reliability. Most systems require precise timing and synchronized control to establish scanning intervals in deriving character information for analysis. This requires transporting the medium in which the characters are presented through a scanning or sensing station at a precisely controlled speed for achieving adequate and reliable sensing of data from the scanned character. Many such systems furthermore require that the characters be of precise widths and that the characters be precisely spaced apart. Still other systems require that the boundaries of each unknown character first be determined before the scanning and recognition operations are initiated. Such requirements of course reduce the versatility of such systems, and the accuracy of recognition. These and other defects of prior art systems are overcome by the method and apparatus of the present invention.

SUMMARY OF THE INVENTION

This invention comprises an improvement over and further development of the basic character recognition method and system of the invention of Raymond J. Deschenes as set forth and claimed in his U.S. Pat. application Ser. No. 128,387, filed Mar. 26, 1971 entitled "Character Recognition Method and System" and to which method and system the invention of John A. Cribbs et al. as set forth and claimed in their U.S. Pat. application Ser. No. 129,341 filed Mar. 30, 1971 entitled "Character Recognition Method and System With Strobe Control" also relates, these applications having been filed concurrently herewith and assigned to the common assignee. The characters which may be recognized are of the well-known match-stick variety, such as the Farrington 7B font. Further, the inventions, though not limited thereto, particularly relate to recognizing such characters from an embossed presentation thereof, as employed in conventional credit cards.

In accordance with that basic recognition method and system, a linear array of plural scanning elements is caused to scan the characters along a corresponding plurality of horizontal scan lines. Each sensor produces output signals identifying the presence or absence of a character segment in its corresponding scan path. A first set of output conditions for the plurality of sensors is defined when the output condition of any thereof identifies the presence of a character segment in its scan path. A successive set of such conditions is defined for each successive occurrence of a change in the output condition of any of the sensors. Thus, as each sensor of the plurality thereof responds to a new condition, i.e., either in making a transition from sensing background to sensing of a segment of the unknown character, or vice versa, the change in the condition of that one sensor, or of two or more sensors simultaneously, thus defines a new set of conditions as occurring in the scan of the character. The successive sets of conditions resultant from scanning of the character thus define successive states.

In the apparatus of the system, logic decoding gates respond to the outputs of the sensors to define corresponding states, or preselected sets of conditions. It is significant to note that no arbitrary timing intervals are imposed in effecting scanning or deriving the sets of conditions; rather, the character configuration itself defines the changes of the conditions and thus defines the new sets thereof and the corresponding sequence of states and state changes. Further, logic recognition means respond to the outputs of the decoders for processing the thus defined, sets of conditions in the sequence in which they occur, and thereby immediately provide an output identifying the unknown character as one of a group of known characters which the system is designed to recognize.

Various sets of conditions may result in scanning a given character, depending upon the character, its font style, and the number of sensors employed. A large number of such sets of sensing conditions may thus be defined, although a relatively small number is adequate to provide highly reliable character recognition in accordance with the present invention. In practice, a limited number of the sets of sensing conditions is usually employed out of the total available. This is done not only to reduce the amount of processing circuitry employed, but also for eliminating any sets of conditions in which uncertainties may exist as the result of the mechanics of the sensing or scanning apparatus and/or the specific character configuration. Decoders are thus provided for the selected sets of conditions to establish the various states employed in the recognition processing. In addition, a decoder is provided for generating a state output identifying the set of output conditions of the plurality of sensors corresponding to the absence of any character segment in any of the scan paths, as occurs in the space between characters. This set, termed the index set, is utilized for various control functions as hereinafter detailed.

It is significant to note that the selection of sets of conditions need not be of sets which are unique to each of the plurality of characters to be recognized but, in fact, the same set or sets may be employed more than once for a given character, or for two or more different characters. This is permitted, since the logic recognition circuits require not only predetermined combinations of states to occur for recognition of the characters, but also that these states occur in a predetermined sequence.

In practical scanning operations, however, simultaneous changes of the output signal conditions defining the sets are not always produced. This results, for example, since the characters are not perfectly rectangular but rather have rounded edges, or corners, as well as modified line locations, to enhance their aesthetic appeal. Embossed characters present further variations in the character structure and errors in alignment. In addition, it is impracticable to manufacture scan heads having scanning elements and associated electrical switching assemblies which are perfectly aligned. Thus, for practical applications, the basic logic processing operations must be augmented to compensate for these variations in character format, or configuration, and alignment as well as for the switching characteristics of the scan head, and the like.

The above noted application of Cribbs et al. covers an invention related to overcoming these problems. In accordance with the invention thereof, it is recognized that the segments of the embossed characters have a finite width, and thus that the sets of conditions defining the states to be processed for character identification exist for some time period proportional to the speed of scanning. Accordingly, the initiation of a state, or a change in state, is recognized to occur upon a change in position of a single scanning element switch and the resultant change in its output signal. In response to each such change, a strobe pulse is generated a time duration thereafter of approximately one half of the average minimum duration of a state. The condition of the switching elements is then sensed at the time of the strobe pulse. This technique therefore permits the use of imperfect switches and allows for some misalignment of characters.

In accordance with the present invention, it is recognized that most of the timing problems which can create erroneous sets of conditions are caused by the curvature of the characters. More particularly, the curvature is introduced at the corners of the upper, lower and middle segments of the characters to be recognized. This curvature affects principally the corresponding upper and lower and middle position scanning elements, as to the timing of their actuation in scanning leading and trailing edges of the characters.

In accordance with the present invention, only the two intermediate elements are utilized to sense leading and trailing edges of the characters; the present invention thus eliminates the curvature problem presented in accurately detecting leading and trailing edge conditions. Further, the present system requires that the intermediate scanning elements for the leading and trailing edges open and close in a distinctive pattern identifying that certain prescribed leading and trailing edge conditions exist before logic decision circuitry is enabled to respond for processing of the sets of conditions defined in scanning a character to achieve character recognition.

Further, the logic circuitry for processing the central and trailing edge conditions is enabled only in response to the determination that a valid leading edge condition has been detected. Accordingly, invalid single conditions cannot result in a character being decoded.

The character recognition logic comprises a plurality of multiple input gates respectively corresponding to the plurality of characters of a group to be identified. Each such gate is enabled only when there are defined, in scanning a character, the preselected sets of conditions occurring in the prescribed sequence. Each such gate, when thus enabled, produces an output identifying the associated character. Readout circuitry receives the outputs of the logic recognition gates, and in response to all of the scanning elements returning to their normally closed positions, thereby to generate an output signal indicating the identified character.

Thus, the system of the present invention affords dynamic processing of the information derived in scanning a character to achieve character identification, but effects storage of the preselected set of conditions for a time duration sufficient to process the leading edge/trailing edge conditions to determine if they occur in a distinctive pattern. If that criterion is satisfied, and if a valid leading edge condition is detected, the logic recognition circuitry is enabled to process the sets of conditions produced in the scanning operation, in accordance with the occurrence of preselected such sets in a prescribed sequence uniquely related to each character to be recognized.

BRIEF DESCRIPTION OF THE DRAWINGS

FIG. 6 comprises a table of the sets of output conditions derived from scanning the characters of FIG. 1 in the direction from right to left thereof and corresponding to the scanning element output conditions as illustrated in FIG. 2;

FIG. 7 comprises a table of sets of conditions resultant from scanning of the characters to be recognized as set forth in the table of FIG. 6 in accordance with prescribed sequences uniquely identifying each character of the class;

DETAILED DESCRIPTION OF THE INVENTION

This invention, as noted above, comprises a further development of, and an improvement over, the basic character recognition method and system of the invention covered by the copending application of Raymond J. Deschenes entitled "Character Recognition Method and System," and to which method and system the invention covered by the copending application of John A. Cribbs et al. entitled "Character Recognition Method and System With Strobe Control" also relates. In those related copending applications, as in this application, the invention is disclosed in the specific context of automated character recognition of characters conforming generally to the well-known Farrington 7B font. It is to be understood, however, that the invention is applicable to the recognition of any of various font styles and for a wide range of alpha-numeric characters.

Figure 1:
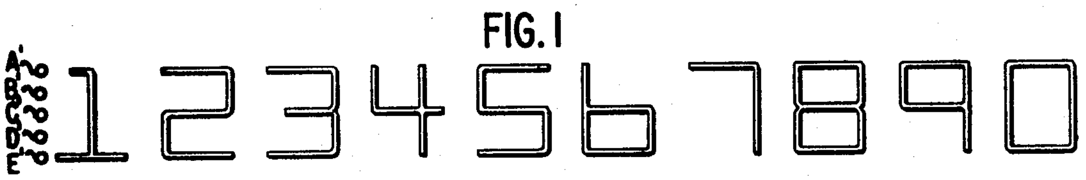
FIG. 1 is a representation of characters to be read by a system and method in accordance with the invention and includes a representation of the scan line or scan positions of a plurality of scanning elements or sensors, utilized to convert the character images into sensing signals.

The numerals 1–9 and 0 are presented herein in FIG. 1 in accordance with that Farrington 7B font style. These characters are generally of the match stick variety and are comprised of basically seven straight line segments or so-called "match sticks." These seven segments comprise upper, lower, and middle horizontal sticks, upper and lower left, and upper and lower right vertical sticks. In general, reference to the numeral, or character, "8" illustrates the totality of the seven light segment font. For enhanced aesthetic appeal, and for ease of visual recognition, however, various contouring effects are presented in the character configuration for closer resemblance to conventional characters. For example, the corners are rounded a bit and a "waist" is provided at the junction of the vertical segments and both ends of the horizontal segment of the numeral "8." Other similar modifications are apparent in the other numerals. Notably, "1" has a small flag extending to the left, as to the numeral "3," the horizontal bar is foreshortened and a "waist" effect and rounding of corners provided, and as to the numeral "4," the continuous vertical line formed by the upper and lower right vertical segments is shifted to the left for more conventional appearance and to assist in distinguishing a 4 from a 9, for example.

The data derived from the characters and converted to electrical signals for processing in the system of the invention is achieved by effecting a parallel horizontal scan of the characters to be recognized in accordance with a plurality of scanning elements, as diagrammatically illustrated at positions A through E in FIG. 1. Further, for a purpose to be explained, the scan is effected in a direction from right to left and particularly for the characters as presented in FIG. 1, in the direction from the numeral "0" to the numeral "1". It is apparent from FIG. 1 that the scan paths of the elements A through E are aligned with, or coincide with, the upper, central and lower horizontal segments of those characters in accordance with the scan paths of elements A, C and E, and with positions intermediate the scan paths of the pair of elements A and C, and of the pair of elements C and E in accordance with the scan paths of elements B and D, respectively. The output conditions of the scanning elements A through E in scanning the characters of FIG. 1 are shown in FIG. 2 in accordance with the dark line of traces in the scan paths of the elements A through E.

Figure 3:
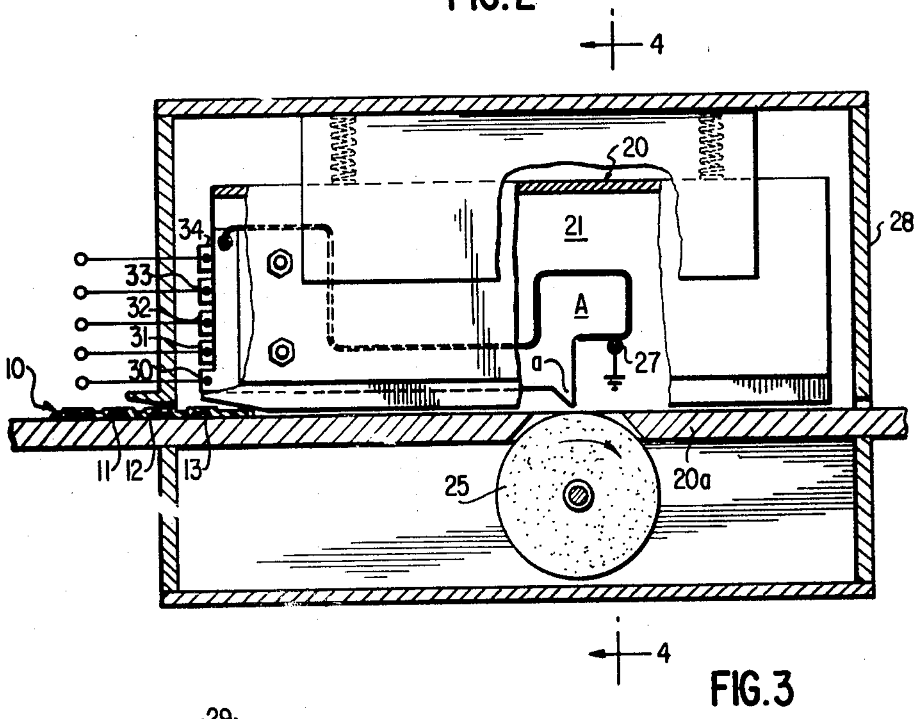
FIG. 3 is a planar view of a scan head suitable for use as the sensors employed in the present invention, and showing, in diagrammatic form, a character-bearing item to be advanced past the head for sensing of characters embossed thereon.
Figure 4:
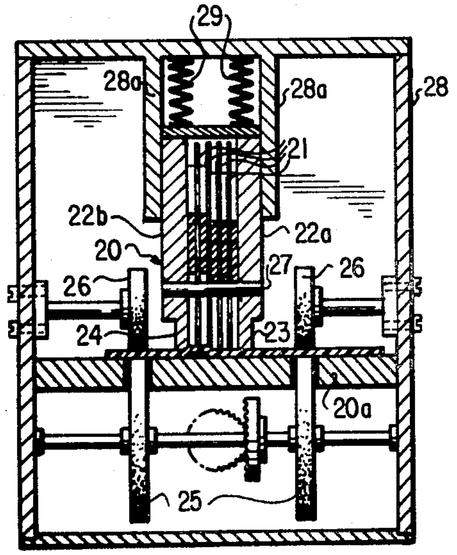
FIG. 4 is an end view of the read head of FIG. 3, additionally showing a drive mechanism for advancing the character-bearing item past the read head for sensing.

Whereas it is again to be understood that the present invention is not so limited, the invention is specifically disclosed herein for the purpose of automatically recognizing characters of the raised or embossed type, as provided on conventional credit cards. Thus, for illustrative purposes, there is shown in FIGS. 3 and 4 a mechanical-electrical scanning head for effecting a scan of embossed characters along a plurality of horizontal paths corresponding to those illustrated in FIGS. 1 and 2. The scan head comprises the invention of Allen Brock and is covered in his application Ser. No. 128,379, filed Mar. 26, 1971 entitled "Electromechanical Read Head," filed concurrently herewith and assigned to the common assignee. The scan head 20 of FIG. 3 is ideally suited for scanning embossed characters such as are typically employed today with credit cards. Such a card is illustrated at 10 in FIG. 3 and includes raised numerals shown diagrammatically at 11, 12 and 13.

Figure 2:
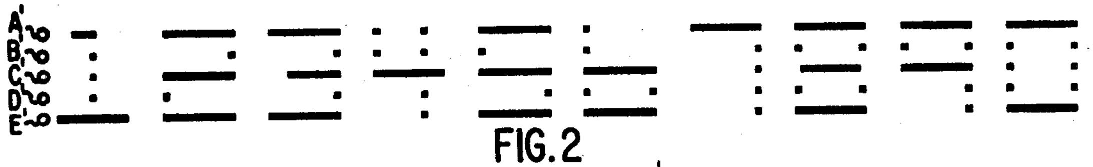
FIG. 2 is a diagrammatic representation of the sensing or output signals of the sensors employed in the scanning operation represented in FIG. 1, the heavy lines defining the character segments lying in the scan paths of the sensors.

The scanning elements of the head 20 comprise a plurality of flexible arms, A, B, C, D, and E corresponding to the scan elements A through E of FIGS. 1 and 2. Each of the elements A through E includes a pick-like feeler or wiper such as *a* illustrated for the foremost element A seen in FIG. 3. The scan elements are separated by low friction, non-conductive spacer sheets 21 of a material such as Mylar not illustrated to permit freedom of vertical motion between the various elements and electrical insulation therebetween. The elements are arranged in parallel side by side relationship with the wipers in aligned position between two supporting walls 22*a* and 22*b* which, for example, are of a relatively thicker and sturdy transparent Mylar material.

As best seen in FIG. 4, the support elements 22*a* and 22*b* respectively include downwardly extending flanges or alignment arms 23 and 24 which engage the opposite top and bottom edges of the embossed characters of the card, as illustrated (for one edge) by the character 11 situated therebetween in FIG. 4.

Preferably, the head 20 is received within a housing 28 in sliding engagement between downwardly extending flanges 28*a*. Resilient biasing means, shown as springs 29, urge the head toward the support surface 20*a* on which the card 10 is received. Transport or drive means schematically illustrated by drive wheels 25 and associated idler rollers 26 engage the card 10 to transport it past the head 20.

The inherent biasing of the resilient arms A through E causes them to normally engage the support rod 27. The rod 27 is of conductive material and is electrically connected to ground potential. Each of the elements A through E may be of conductive material or alternatively may include a conductive material on the edge thereof extending from the lower surface of the laterally extending portion which engages the rod 27 to corresponding output terminals 30 through 34. In operation, when the wiper of any element engages a character segment in its scan path, the element is raised, thereby breaking the electrical connection to the rod 27 and effecting a switching action to produce an electrical output signal.

Figure 5:
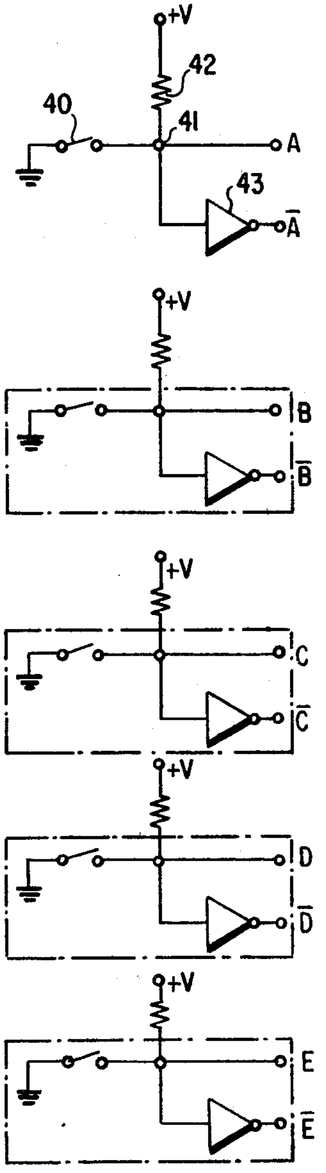
FIG. 5 comprises a group of schematics of switching circuitry corresponding to the scanning elements of the type shown in FIGS. 4 and 5 and signal processing circuits associated with the output of the switching circuitry.

In FIG. 5, there is shown a schematic of suitable switch circuitry utilized in providing electrical output signals indicating the sensing conditions A through E as well as the converse thereof, $\overline{A}$ through $\overline{E}$. Since each of these circuits may be identical, only the circuit for the output signals identifying the conditions A and $\overline{A}$ is described in detail.

The illustrative circuit includes a switch 40 connected at one terminal to ground and at the other terminal thereof to a junction 41, in turn connected through a resistor 42 to a positive potential source. Junction 41 is connected directly to an output terminal labelled A and through an inverter 43 to an output terminal labelled $\overline{A}$.

The switch 40 corresponds to the switching function of the switch element A in FIG. 3 and particularly the contact elements provided by the lower surface of the lateral arm *a'* and the contact rod 27, the latter being connected to ground. Switch 40 is normally closed, tying terminal 41 to ground and thus producing a zero or ground potential output.

Ground potential is defined as a logic "0." Inverter 43 inverts the ground potential output at junction 41 and produces a positive potential output at the terminal for condition $\overline{A}$. A positive potential defines a logic "1," or true, and thus indicates the condition $\overline{A}$ to be true. When the switch 40 opens, as when the element A is raised by engaging the embossed surface of a character, a positive potential appears at junction 41 corresponding to a logic "1" state, or a true condition for the output A and a false condition for the output $\overline{A}$.

It is apparent that any suitable technique for generation of the outputs in FIG. 5 may be employed. Thus, optical scanning techniques or any of a number of other scanning techniques may be employed to generate the noted outputs. The structure of FIGS. 3 and 4 is merely illustrative of one suitable scanning technique.

Returning now to FIG. 2, there is illustrated the response of the five scanning elements in the scanning of the characters of FIG. 1. It is assumed that the characters are of equal height and the vertical displacement of the scanning elements A and E, and thus their associated scan paths, correspond thereto. It is also assumed that the middle scanning element C and its associated scan path corresponds with the middle horizontal stick or line segment of the specified font style. The outputs or responses of the scanning elements A through E, assuming relative horizontal movement of these elements and the characters to be recognized, are thus illustrated by heavy dark lines corresponding to the intersection or coincidence of the respective scan paths of those elements and the segments or portions of the characters.

FIG. 6 comprises a table entitled "Scanned Sets of Conditions" and provides in a tabular from the graphic representation of FIG. 2 of the outputs of the scanning elements, assuming a scan of the characters in FIG. 2 to proceed from right to left, i.e., from the "0" through to the "1". That direction of scan can, of course, be accomplished either by moving a scan head horizontally along the line of characters, from right to left, or by providing a stationary scan head and moving the characters from left to right relative thereto.

With regard to the table of FIG. 6, a set of conditions is defined to mean a specific combination of simultaneously occurring output conditions of the plurality of sensing elements A through E encountered in scanning each character of the class or group to be recognized. Here, the class of characters comprises the numerals 1–9 and 0, and particularly of the Farrington 7B font style. As is apparent from FIG. 6, differing numbers or sets of conditions are derived in scanning of the various numerals of the selected class, the maximum number being five such sets for the numeral "8" and the minimum being two such sets for the numeral "7".

In the table of FIG. 6, as well as that in FIG. 7 to be discussed, the letters A through E are utilized in the conventional Boolean algebra sense to correspond to the output signal conditions of the scanning elements A through E produced thereby in effecting their respective scans as illustrated and discussed in relation to FIGS. 1 and 2. More particularly, the symbols A through E define the sensing of a character segment and thus correspond to the heavy line portions in FIG. 2. The symbols $\overline{A}$ through $\overline{E}$ correspond to the absence of scanning of character segments and thus to the locations in the respectively corresponding scan paths of the elements A through E in which the elements are not sensing a segment of a character.

The sets of conditions which obtain in scanning each of the characters 1–9 and 0 are thus set forth in the table of FIG. 6 and may be compared directly with the scan indications in FIG. 2. It is important to note that the sets of conditions occur in a sequence uniquely related to and directly defined by the configuration of each character. That is, each set of conditions is established as a direct result of the scanning operation. Further, a new set is defined when the condition of any one or more of the scanning elements A through E changes.

For example, the numeral "1" defines three sets of conditions. The first set, $\overline{A}\ \overline{B}\ \overline{C}\ \overline{D}$ E is that of the condition E being true and the other conditions being not true, or false, i.e., the scanning element E has detected a portion of the unknown character and which, with reference to FIGS. 1 and 2, comprises the lower horizontal segment, and the other scanning elements have not detected any portion of the character. When the vertical segment of the "1" is detected by the elements A, B, C and D and since element E continues to detect the lower horizontal segment, the new set A B C D E obtains. Proceeding in the right to left direction of scan, and passing beyond the vertical line of the numeral "1", the flag portion at the top of the numeral and the lower horizontal bar continue to provide the conditions A and E whereas the elements B C D return to sense the background level and thus the new set of conditions A $\overline{B}\ \overline{C}\ \overline{D}$ E obtains. Finally, only the condition E remains true after passing beyond the flag of the "1" and thus the final set $\overline{A}\ \overline{B}\ \overline{C}\ \overline{D}$ E obtains.

Note particularly that the various sets of conditions are independent of the duration of these conditions and further that the recognition of these various sets relates entirely to the actual scanning of the configuration of the character and is not imposed by any arbitrary timing function. Further, assuming the same general relationship of the segments of each character, these identical states will obtain regardless of over-all character width variations, whether of a random or uniform nature, with respect to the individual characters of the set.

The basic recognition technique of the present invention as well as that of the inventions of the previously noted Deschenes and Cribbs et al. applications, resides in the dynamic processing of the successive sets of conditions, or so-called states, in accordance with prescribed sequences thereof for achieving character recognition. As noted, each character may be identified in accordance with detecting a prescribed sequence of preselected states uniquely related to that character.

The detection of these sequences of states implies that the output conditions for each set will be detected substantially simultaneously. This capability necessarily assumes a substantial degree of integrity and uniformity of the character format, or configuration; this, however, does not necessarily obtain in practice. More specifically, the embossing or printing of the characters to be recognized introduces imperfections in the character configurations, both the location of line segments and misalignment of the characters, i.e., some skewing of the axis of each character from a precise transverse relationship to the horizontal line in which the character is to be scanned.

These possible imperfections in character configuration and misalignments of the characters present potential errors in the basic recognition technique, since the reliability of the sensing of those conditions and the simultaneity of the sensing thereof in accordance with the preselected sets of conditions cannot be assured.

Additional sources of potential error result from intentional modifications of the character configuration, generally termed contouring, as provided for enhancing the appearance thereof and rendering them more conventional in appearance. For example, the corners of the characters are rounded, and indentations are provided, as in the "waist" of the numeral "8" as previously described. The curvature at the corners, for example, introduces the potential source of error of failing to achieve simultaneous sensing of a vertical line segment at the extremes thereof by the A and E scanning elements, when the intermediate portions of such a line are sensed by the B and D scanning elements. Where the contouring effect is extreme, as in the case of the "waist" in the numeral "8", an unreliable second state as shown in the table of FIG. 6 is proposed to exist but may, in practice, not be detected in the scanning operation.

Accordingly, it is necessary for achieving accurate and reliable character recognition, in a practical application, that the basic recognition technique as above set forth be augmented by techniques to eliminate or avoid these potential sources of error.

In accordance with the present invention, it is recognized from a study of the embossed characters and the resultant encoding functions as afforded by the scanned sets of conditions in the table of FIG. 6, that most of the timing problems which create erroneous states, or sets of conditions, are caused by the curvature of the characters. The particular difficulties presented by the curvatures in relation to character configuration have been previously discussed; in the present context, it will be appreciated that the curvature affects primarily the A C and E scanning elements and their corresponding outputs.

The effects of curvature and character misalignment are reduced in accordance with the present method and system by using only the B and D scanning elements to sense the leading and trailing edge conditions, and by further requiring that the B and D wipers open and close in a distinctive pattern before concluding that a given leading or trailing edge condition exists. Further, only the A, C, and E elements are utilized for detecting a central condition. Finally, various enabling functions are provided to assure that valid leading, central and trailing edge conditions have been detected, and that they have been detected in the proper and complete sequence thereof, before an output identifying a recognized character can be produced.

The selection of the B and D scanning elements for the leading/trailing edge conditions is based on an analysis of the characters which demonstrates that, by scanning thereof from right to left, all of the leading edge or initial condition indexing required for the recognition logic may be accomplished by the B and D scanning element outputs alone. A further analysis of the characters and the scanned sets of conditions demonstrates that a central condition, i.e., one intermediate the leading and trailing edge conditions, can be developed utilizing exclusively the A, C and E scanning element outputs. Thus, the B and D scanning elements and the A, C and E scanning elements and their respective output conditions are utilized in a mutually exclusive sense for the logic recognition function in accordance with obtaining three successive sets of conditions, the particular sets of conditions themselves being preselected and occurring in a prescribed sequence, and which thereby uniquely identify each character of the class to be recognized.

Referring now to FIG. 7, there are set forth in tabular form sets of conditions selected from the scanned sets, in accordance with the selection of sensing element output conditions as above described. Each selected set in FIG. 7 is further identified in relation to the scanned sets by a number in parenthesis corresponding to the numbered, scanned set of conditions set forth in the table of FIG. 6.

Many of the sets of the table of FIG. 6 are not utilized. Thus, the set selection also permits of maximizing the differences between the sets which are utilized in the logic recognition circuitry. By selecting sets with maximum distinctions therebetween, maximum reliability in the recognition function is realized. Further, reducing the number of sets contributes to simplification in circuitry and cost reduction. A limited degree of redundancy in the prescribed sequences of states is, however, desirable to assure reliability. Note in FIG. 7, for example, that the conditions E and $\overline{E}$ could be eliminated from the sets of central conditions, while retaining unique sequences for the numerics shown.

In general, substantial redundancy is available in the 7B font style and in most other font styles developed for automatic character recognition. Accordingly, it will be appreciated that a substantial number of characters may be automatically recognized by the method and system of the invention in accordance with the selection techniques and processing functions herein set forth.

The elimination of potential errors by the set selection afforded by the present invention will be readily appreciated with respect to the selected sets for the numeral "8" as set forth in FIG. 7. From the previous discussion of character configurations relating to the numeral "8", it will be appreciated that the leading edge condition B D is reliable, regardless of whether it obtains from the first or second scanned set of conditions for the numeral "8" as shown in FIG. 6, since that selected set of conditions B D is not affected by the variations introduced by the contouring effects on the leading edge of that numeral. The same comments apply as to the selected set of trailing edge conditions B D for the numeral "8". Accordingly, the leading and trailing edge conditions for the numeral "8" are identified in FIG. 7 as corresponding to the first and second states, and the fourth and fifth states, respectively, of the scanned sets as set forth in FIG. 6.

The detailed logic diagram of the character recognition circuitry has been shown for convenience in individual FIGS. 8 through 18, inclusive, and will be understood to be suitably interconnected in an operating system to perform the required recognition functions.

As previously noted, a character index condition identified as $\overline{A}\ \overline{B}\ \overline{C}\ \overline{D}$ and $\overline{E}$ is sensed at any time that all of the corresponding elements are in the rest positions and thus not engaging any character segments in the respective scan paths. This set of conditions obtains for the plurality of sensing elements both prior to scanning any character and intermediate any two successive characters. It will be noted, however, that throughout the scan of any given character, at least one scanning element is raised at all times. Thus, the character index condition is conveniently utilized for generating both enabling and resetting functions in the processing and logic recognition circuitry.

Figure 8:
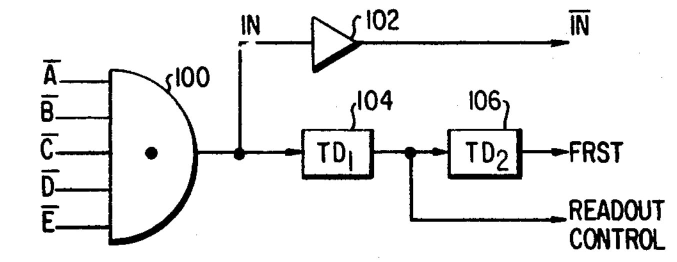
FIG. 8 comprises a logic diagram of circuitry responsive to a character index condition for producing various enabling, reset and control outputs.

FIG. 8 comprises a logic diagram of the circuitry responsive to the character index condition for producing various enabling and reset and control outputs. Specifically, AND gate 100 receives the outputs $\overline{A}\ \overline{B}\ \overline{C}\ \overline{D}$ and $\overline{E}$ from the switching circuitry of FIG. 5 and is enabled to produce the IN (index) output when each of these input conditions is true and thus when each of the sensing elements is in a rest condition. The IN output is inverted by inverter 102 to provide the output $\overline{IN}$, and additionally is supplied to two series connected time delay circuits 104 and 106, the former providing a readout control output and the latter providing an output FRST (final reset).

Figure 9:
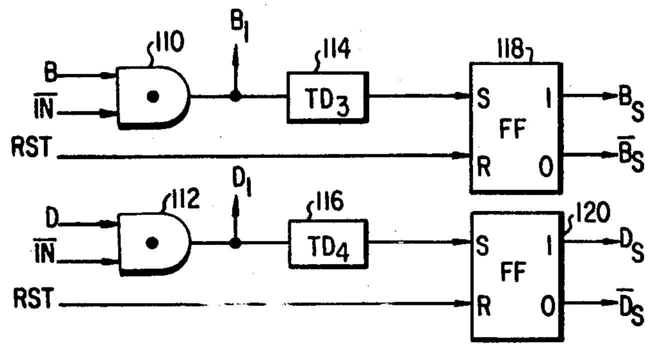
FIG. 9 comprises a logic diagram of input gating and storage circuits for output conditions derived in scanning the leading and trailing edges of a character.

As previously discussed, the outputs of the B and D scanning elements are utilized to provide the selected sets of conditions for the leading and trailing edge detection. In FIG. 9 is shown a logic diagram of input gating and storage circuits for the output conditions of these scanning elements. Subsequent processing of the stored conditions is dependent upon a further determination that these scanning elements have both opened and closed in a distinctive pattern before a decision is made that a valid leading or trailing edge condition exists.

Accordingly, the B and D outputs are supplied as first inputs to corresponding AND gates 110 and 112, the second inputs of each thereof receiving the $\overline{IN}$ output of the indexing logic circuitry of FIG. 8. When the character index condition terminates, the $\overline{IN}$ inputs provide first enabling inputs to the AND gates 110 and 112 and, if either or both of the conditions B and D is also true, the AND gates 110 and 112 produce the corresponding outputs $B_1$ and $D_1$. The $B_1$ and $D_1$ outputs are supplied to leading/trailing edge enable circuitry of FIG. 10, to be described, as well as through time delay circuits 114 and 116, respectively, to the set inputs of corresponding storage circuits 118 and 120. The circuits 118 and 120 may comprise conventional flip flops or latch circuits. The reset inputs of the circuits 118 and 120 receive a reset RST, to be described. Further, the set and reset outputs of the storage circuits 118 and 120, as there indicated, comprise $B_s$ and $\bar{B}_s$, and $D_s$ and $\bar{D}_s$, respectively, indicating either of the B or the D conditions, or both, as either having been detected, or not having been detected. The purpose of the time delay circuits 114 and 116 is explained hereinafter.

Figure 10:
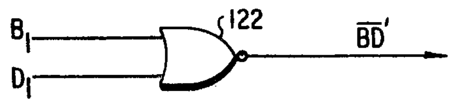
FIG. 10 comprises a logic diagram of an enabling circuit for the procssing of leading and trailing edge output conditions.

The logic circuit of FIG. 10 performs the function of requiring that the B and D conditions, and thus the corresponding scanning elements, open and close in a distinctive pattern before logic processing of those conditions is enabled to define the specific set of leading or trailing edge conditions which has been detected. The circuit comprises a logic NOR gate 122 receiving the $B_1$ and $D_1$ outputs from the circuit of FIG. 9 and producing in response thereto the logic output $\bar{B}\ \bar{D}$. It will be appreciated that the output of NOR gate 122 is thus true, or logic "1" only when neither of the input conditions $B_1$ and $D_1$ obtains, i.e., both of the B and D scanning elements have returned to a rest position.

Figure 11:
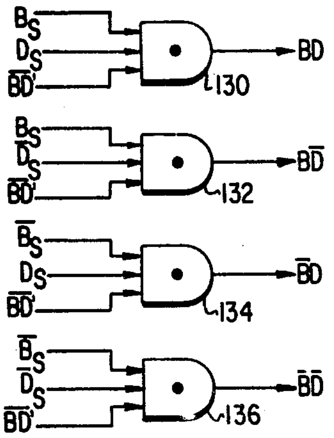
FIG. 11 comprises a logic diagram of decoding circuits for selected sets of output conditions identifying the leading and trailing edges of each character being scanned.

FIG. 11 comprises a diagram of the decision logic circuits, or logic decoding gates, for determining the specific set of leading or trailing edge conditions which has been detected. This function is dependent upon the receipt of an enabling output from the logic circuit of FIG. 10 which indicates that the prescribed pattern of the B and D conditions has been satisfied. Particularly, AND gates 130, 132, 134 and 136 each receive as an enabling control input, the output $\bar{B}\ \bar{D}$ from the enable circuit of FIG. 10, as well as various combinations of the outputs $B_s$, $\bar{B}_s$, $D_s$, and $\bar{D}_s$ from the leading/trailing edge condition storage circuits 118 and 120 of FIG. 9.

When the B and D elements return to a rest position, the condition $\bar{B}\ \bar{D}$ is true and the appropriate one of the gates 130, 132, 134 and 136 is enabled in accordance with the outputs of the storage circuits 118 and 120 of FIG. 9 to identify the particular leading or trailing edge condition which has been detected, i.e., B D, B $\bar{D}$, $\bar{B}$ D, or $\bar{B}\ \bar{D}$, respectively. From FIG. 7, the leading edge condition for each character to be recognized comprises one of the conditions BD, B$\bar{D}$ or $\bar{B}$D, corresponding to the outputs of the AND gates 130, 132 and 134, respectively, in FIG. 11. The fourth condition $\bar{B}\ \bar{D}$ comprising the output of AND gate 136 in FIG. 11, is utilized only for the trailing edge detection in accordance with FIG. 7, as later discussed.

Figure 12:
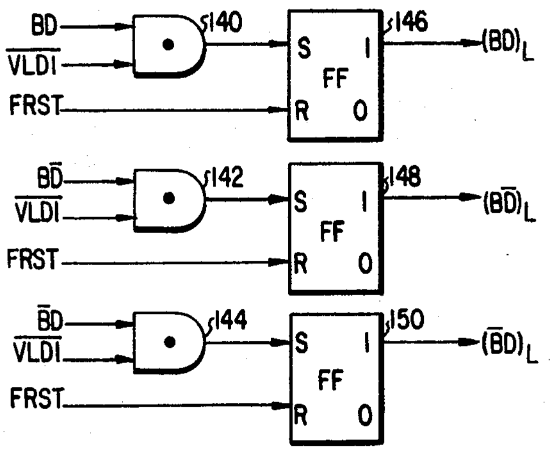
FIG. 12 comprises a logic diagram of gating and storage circuits for selective storage of the decoded, selected set of conditions identifying the leading edge of a character being scanned.

Accordingly, the gating and storage circuits of FIG. 12 for the set of leading edge conditions respond only to these first three logic outputs of the circuits of FIG. 11. More particularly, AND gates 140, 142 and 144 of FIG. 12 receive the outputs B D of gate 130, B $\bar{D}$ of gate 132 and $\bar{B}$ D of gate 134, respectively, of FIG. 11. The second input to each of these AND gates 140, 142, and 144 comprises an enable signal $\overline{VLD1}$ which is normally true or logic "1". $\overline{VLD1}$ is produced by the circuit of FIG. 13, to be described, and becomes false, or logic "0" when a valid leading edge condition obtains. Thus, after the detected set of leading edge conditions is gated through the corresponding AND gate, all of the AND gates are disabled by $\overline{VLD1}$ becoming a logic "0", in accordance with the recognition of a valid leading edge set of conditions.

The storage circuits 146, 148 and 150 of FIG. 12 may again comprise flip-flops or latch circuits. A given one of the flip-flops 146, 148 and 150 in FIG. 12 thus is set when a valid set of leading edge conditions is detected and gated through the corresponding AND gate. Accordingly, the output of the set one of the flip-flops 146, 148 and 150 maintains the identification of the detected one of the set of leading edge conditions $(B\ D)_1$, $(B\ \bar{D})_1$ and $(\bar{B}\ D)_1$, respectively. The flip-flops 146, 148 and 150 further receive at the reset inputs thereof, the final reset output FRST of the circuit of FIG. 8. It will be recalled that FRST is produced a time delay following a subsequent indexing condition IN which occurs only after completion of scan of a given character. Each of these storage circuits thus maintains the identification of the detected set of leading edge conditions throughout the logic processing steps associated with the scanning of each character, and then all are cleared prior to detection of scanning conditions for the next successive character.

Figure 13:
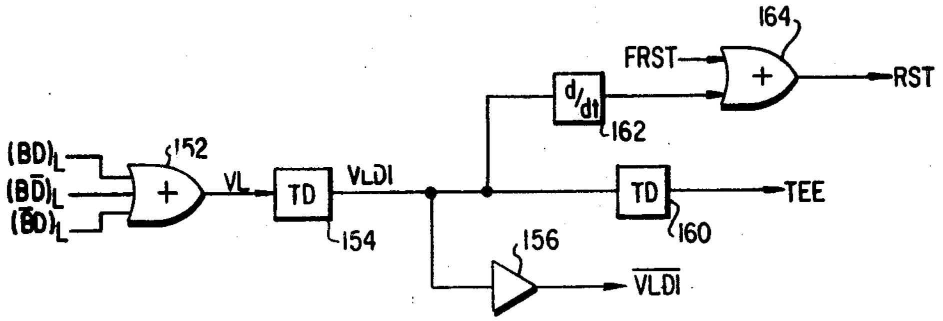
FIG. 13 comprises a logic diagram of timing control circuits responsive to the identification of a decoded and selected set of leading edge conditions for enabling processing of central and trailing edge conditions.

These leading edge conditions from the storage circuits of FIG. 12 are supplied to the leading/trailing edge logic control circuitry of FIG. 13, and particularly to the input OR gate 152 thereof. The output VL from the gate 152 is produced in response to receipt of any of the selected sets of leading edge conditions. VL is supplied through a first time delay circuit 154 to provide VLD1 and, through inverter 156, to produce $\overline{VLD1}$. VLD1 is also supplied through a further time delay circuit 160 to produce the output TEE and to a differentiator circuit 162, the output of the latter being supplied as input to an OR gate 164. OR gate 164 also receives FRST from FIG. 8. Either of the inputs to OR gate 164 thus produces the reset output RST.

The various time delay circuits and their timing control functions for assuring the proper sequence of logic processing steps will now be considered. It should be noted that in at least some instances, the inherent time delays of the various circuits may themselves be adequate to provide proper operational sequences. Thus, the time delay circuits are not necessarily essential, but are provided to assure that proper sequences are maintained. Further, whereas the various signals, once detected, are processed in each logic circuit, or stage, in a matter of nanoseconds the input signals defining successive sets of conditions vary in a matter of milliseconds, such as in the use of the mechanical-electrical scan head for scanning embossed characters, as specifically disclosed herein. Thus, ample time is afforded for the logic processing of the signals derived from the scanning operations.

To simplify the discussion of the time delay circuits, the respective time delays are hereafter represented by the symbol TD followed by the subscript of the identifying numeral for that circuit.

The IN condition, as noted, is normally true, i.e., prior to scanning of any characters. Thus, FRST, from FIG. 8 is also normally true. As a result, RST, from FIG. 13, is also normally true, and thus maintains the leading edge/trailing edge storage circuits 118 and 120 of FIG. 9 in the reset, or cleared, states.

Loss of the IN condition, upon initially detecting a character, then results in FRST a time delay of $TD_{104}+TD_{106}$ later, from FIG. 8, and of RST, from FIG. 13. In FIG. 9, AND gates 110 and 112 are thus enabled to gate through the respective inputs B and D. Delay circuits 114 and 116 thus are provided to assure that RST has terminated before $B_1$ and $D_1$ are applied to the storage circuits 118 and 120. Particularly, $TD_{114}$ is made equal to $TD_{116}$ and each is less than the intercharacter scan time, the latter typically being several milliseconds. Further, each of $TD_{114}$ and $TD_{116}$ is greater than the sum of $TD_{104}$ and $TD_{106}$, to achieve this result. Thus, the B and D leading edge conditions are stored to provide $B_s$, $\overline{B}_s$, $D_s$ and $\overline{D}_s$ to the decoding circuits of FIG. 11. The decoded leading edge set of conditions then is stored in the appropriate circuit of FIG. 12 since the input gates 140, 142 and 144 are normally enabled by $\overline{VDL1}$.

In FIG. 13, the recognized, valid leading edge condition is gated through OR gate 152 to produce VL. Delay circuit 154, in turn, produces VLD1 and, through inverter 156, $\overline{VLD1}$. $\overline{VLD1}$ thus becomes logic "0" and disables the input AND gates 140, 142, and 144 of FIG. 12. The leading edge condition is thus stored until the next occurrence of FRST, and the input AND gates isolate the storage circuits from any further B or D inputs. This is important since, as later discussed, certain of the circuits utilized for determining the leading edge condition are also utilized for determining the trailing edge condition. Thus, it is necessary to isolate the leading edge condition storage circuits once a valid leading edge condition is recognized and defined. $TD_{154}$ thus is selected to assure that the storage circuits 146, 148 and 150 of FIG. 12 are stabilized, i.e., as to setting of one thereof in accordance with the detected leading edge set of conditions, before $\overline{VDL1}$ is produced. Here, inherent delays may provide an adequate time delay for the function of $TD_{154}$.

Also in FIG. 13, VLD1 produces, through time delay circuit 160, the trailing edge enable output TEE. $TD_{160}$ assures that RST has been produced, in this instance from differentiator 162 in response to the leading edge of VLD1, and that the B and D condition storage circuits 118 and 120 of FIG. 9 have been reset, before the trailing edge enable signal TEE is produced. TEE, as will be appreciated, establishes that a valid leading edge condition has been detected. Accordingly, both the central condition and the trailing edge condition circuits are made to require the receipt of TEE, to be enabled for processing of the corresponding, received conditions. More specifically, TEE is employed as an enable signal for producing the central condition enable signal CCE in FIG. 14 and for the trailing edge or final condition logic decision circuit of FIG. 17, both to be described. Thus, in the logic processing circuitry of the system of the invention, a valid leading edge condition must be detected before the logic circuits for determining the central and trailing edge conditions are enabled.

Figure 14:
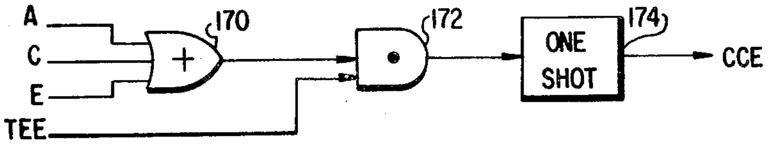
FIG. 14 is a logic diagram of an enabling circuit for the processing of central conditions and responsive to the control circuit of FIG. 13.

As will be recalled, the outputs of the A, C and E scanning elements are utilized for establishing the central condition. In FIG. 14, the outputs of those elements A, C and E are applied to an input OR gate 170. The output of OR gate 170 is supplied to a first input of AND gate 172 which receives as a second input the enabling output TEE from the control circuitry of FIG. 13. When AND gate 172 is enabled by TEE, the presence of a central condition in accordance with any of the outputs A, C and E being a logic "1" produces an output from AND gate 172 which in turn triggers the one shot circuit 174 and produces the output CCE (central condition enable). The CCE signal is a noncritical, short duration sampling signal. Circuit 174 alternatively may be a differentiator which produces a narrow, or short duration, pulse output.

Figure 15:
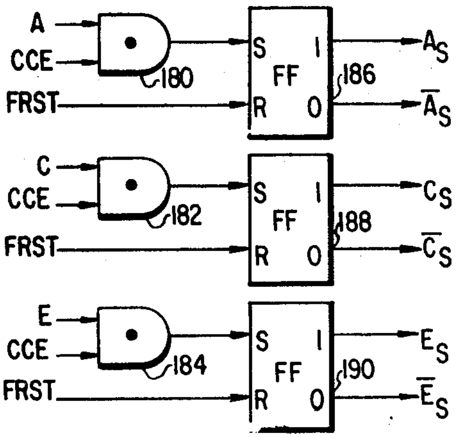
FIG. 15 is a logic diagram of gating and storage circuits for processing of the central conditions.
Figure 17:
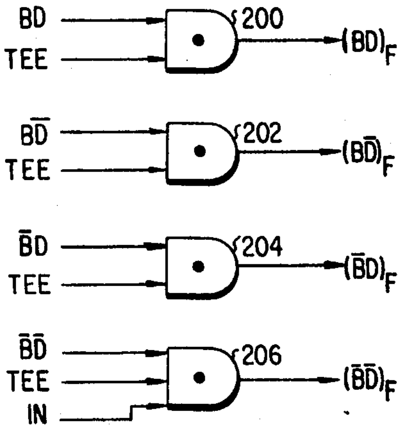
FIG. 17 is a logic diagram of gating circuitry for processing of the trailing edge conditions.

Referring now to FIG. 15, the output conditions A, C and E are supplied to the first inputs of AND gates 180, 182 and 184, each of which receives as a second input thereto the CEE signal from the circuit of FIG. 14. CCE enables the input gates 180, 182 and 184 to the central condition storage circuits 186, 188 and 190 for a short interval, thereby to effect storage of the detected central conditions. Specifically, the outputs of the AND gates 180, 182 and 184 are supplied to the set inputs of the respectively corresponding storage circuits 186, 188 and 190, which again may comprise conventional flip-flops. Each of these storage circuits furthermore receives the final reset output FRST from FIG. 8. The set and reset outputs of these flip-flops provide the stored indication of the central conditions which have been detected, as identified in FIG. 15 by the outputs $A_s$, $\overline{A}_s$, $C_s$, $\overline{C}_s$, and $E_s$, $\overline{E}_s$.

Figure 16:
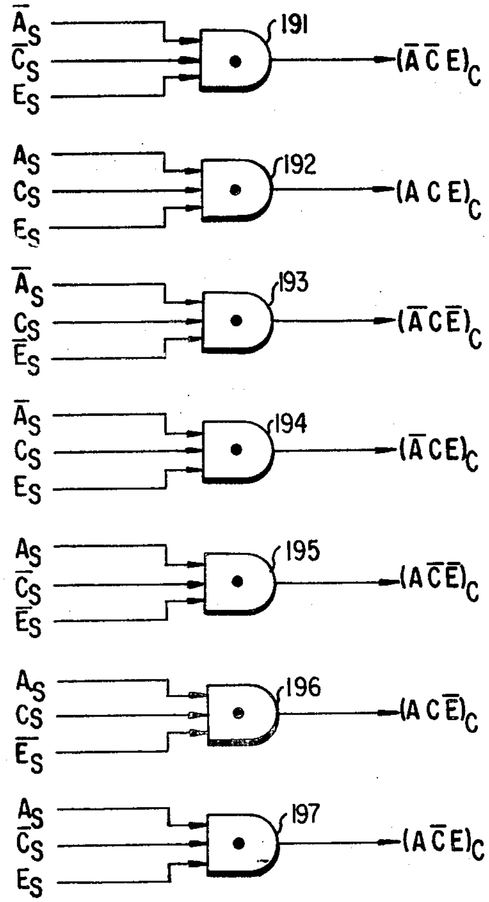
FIG. 16 is a logic diagram of decoding circuits for identification of selected sets of central conditions.

The stored central conditions from FIG. 15 then are supplied to the logic decision, or decoding, AND gates 191–197 of FIG. 16 which define the set of central conditions presented by the stored central conditions from FIG. 15. Each such set is accordingly identified by the subscript "*c*", e.g., $(\overline{A}\,\overline{C}\,\overline{E})_c$, $(A\,C\,E)_c$, etc.

As thus far described, the system has provided for analyzing the output conditions of the scanning elements to determine if a character index condition exists and, when that condition ceases to exist, to determine if a valid leading edge condition has been detected. That determination furthermore is dependent upon a predetermined pattern in the opening and closing of the B and D scanning elements which, if that pattern is satisfied, results in the storage of the leading edge condition as processed by the leading/trailing edge decision logic. In accordance with that valid leading edge condition, an enable signal is produced for generating a short duration sampling signal for enabling storage of the central conditions detected by the scanning elements. The stored central conditions then are supplied to central condition decision logic which defines the particular set of central conditions which has been detected, in accordance with one of the selected sets of possible such sets of central conditions. Thus, the leading and the central conditions produced in scanning of a given character have been processed, the specific set of leading edge conditions has been stored (to release the leading edge processing circuits for further use in the trailing edge detection) and the central conditions themselves have been stored and made available to the central condition logic which thus maintains an output defining the specific set of central conditions which has been defined.

As noted, the trailing edge or final condition is again determined by the B and D outputs. For simplicity and cost economy, therefore, it is convenient to process the B and D outputs for the trailing edge condition by the same circuits as utilized for the leading edge condition. Thus, the trailing edge conditions are received and stored in the circuits of FIG. 9 upon receipt of either or both of the B and D outputs, since the $\overline{IN}$ condition remains true. Further, the particular set of trailing edge conditions represented by the B and D outputs is determined by the decision, or decoding, logic of FIG. 11 when the enabling condition $\overline{BD}$ is produced by the circuit of FIG. 10, as in the case of the processing of the leading edge conditions. The sets of trailing edge conditions produced by the decision logic of the circuits of FIG. 11, and particularly including the $\bar{B}\,\bar{D}$ condition in addition to the others which were also utilized for the leading edge condition,as previously described, are then processed by the trailing edge condition circuits of FIG. 17. More particularly, the AND gates 200, 202, 204 and 206 of FIG. 17 receive the trailing edge condition outputs of AND gates 130, 132, 134 and 136, respectively, of FIG. 11, as well as each thereof receiving the trailing edge enable signal TEE from the control circuitry of FIG. 13. TEE thus enables each of the AND gates 200, 202, 204 and 206. One of the gates 200, 202 or 204 thus produces an output in accordance with either or both of the B and D conditions being received. If neither the B nor the D condition is received, upon receipt of the next index condition IN, AND gate 206 is enabled to produce $\bar{B}\,\bar{D}$ trailing edge set of conditions.

Figure 18:
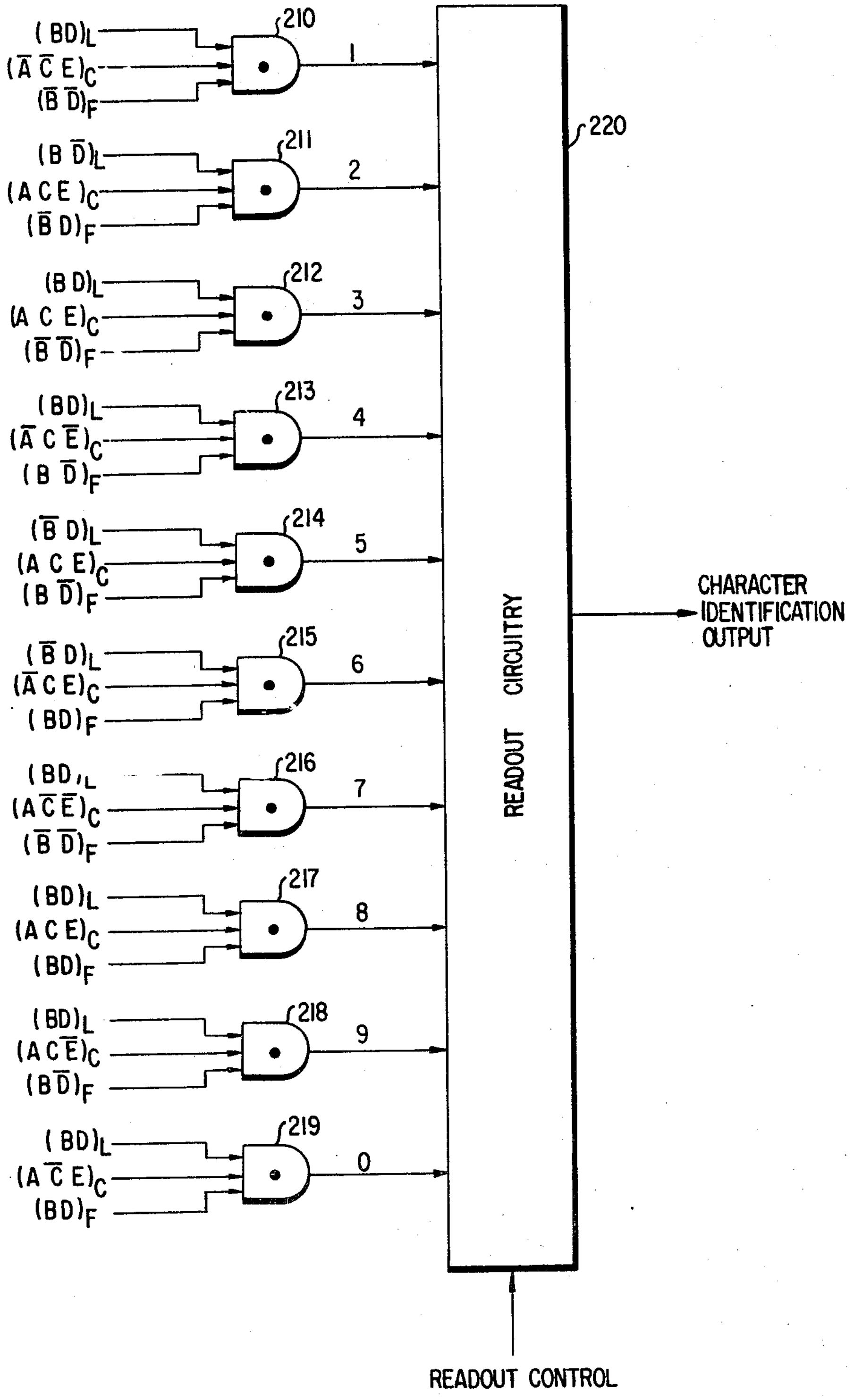
FIG. 18 is a logic diagram of character recognition circuits selectively responsive to the outputs of the leading edge, central and trailing edge decoding circuits of the foregoing figures for identification of each character of the class to be recognized.

Referring now to FIG. 18, the final step in the logic recognition processing is now accomplished. Particularly, the gates, 210, 211, 212, 213, 214, 215, 216, 217, 218 and 219 receive respectively related ones of the leading, central and final or trailing edge sets of conditions from the respectively associated logic processing and storage circuits as above described, as first, second and third inputs to each thereof. These inputs, furthermore, conform to the prescribed sequences of the selected sets of conditions as shown in the table of FIG. 7. These prescribed sequences are uniquely related to, and thus serve to identify, the corresponding characters. To relate the various logic diagrams herein, the leading edge sets of conditions are supplied from the circuits of FIG. 12, the central sets of conditions from the circuits of FIG. 16, and the final or trailing edge sets of conditions from the circuits of FIG. 17.

The recognized character is presented to the readout circuitry 220 in FIG. 18 by the output from the enabled one of the gates 210–219. The readout circuitry 220, in turn, receives the readout control signal from the time delay circuit 104 of the indexing and reset logic of FIG. 8 shortly after the index condition IN is produced, and thus following completion of scanning of the character. The delay 104 assures that the recognition or decoding logic gates 210–219 have stabilized prior to the readout circuit 220 receiving the single output identifying a recognized character. The readout circuitry thus responds to the readout control signal to provide an output signal identifying the recognized character. That output may then by supplied to buffer storage means (not shown) or other utilization circuits, as desired. Shortly following the readout control signal, the final reset signal FRST is produced by the time delay circuit 106 in FIG. 8 for resetting the entire system.

As above noted, since IN is produced whenever characters are not being scanned, both the readout control and FRST are maintained as levels rather than merely pulses. The various storage circuits are thus maintained in the cleared state until a new character is scanned. The complete sequence is initiated again as soon as the index signal, IN, becomes logic "0", or is lost, and thus the condition $\overline{IN}$ is established upon detecting the leading edge of the next successive character.

The invention may be used for automatic recognition of any characters which can be scanned to produce sets of conditions susceptible to selection as above described for logic processing. Thus, the characters may be embossed, as specifically disclosed, or of printed form, capable of being scanned by optical scanning apparatus. Further, the class of characters is not limited to the numerics illustrated, although it is necessary that the character configurations conform to the selection of sets of conditions as hereinabove set forth, thereby to provide prescribed sequences of such sets uniquely identifying each character of the class.

Numerous modifications and adaptations of the invention will be apparent to those skilled in the art and thus it is intended by the appended claims to cover all such modifications and adaptations thus falling within the true spirit and scope of the invention.

What is claimed is:

1. A method of character recognition for characters of a class having a font style of substantially straight line segments including upper and lower vertical segment positions and upper, middle, and lower horizontal segment positions, comprising:

scanning each character of the class to be recognized in a plurality of horizontal scan paths by a corresponding plurality of scanning elements aligned transversely to the scan paths and wherein said paths include at least two scan paths aligned with two of said horizontal segment positions and two scan paths respectively intermediate the upper and middle, and the middle and lower horizontal segment positions, said scanning elements producing output conditions identifying the presence or absence of a character segment in the respective scanning paths, each character having a commonly disposed vertical portion including at least one of said vertical segments and defining the leading edge thereof, said vertical segment being scanned by the scanning element of the corresponding one of said intermediate paths, and a central portion including one or more of said horizontal segments and neither of said vertical segments, effecting said scanning of each character in a common direction to scan in succession the leading and central portions of each character, identifying an initial set of output conditions in response to one sensor output identifying a character segment in its corresponding scan path, and successive sets of conditions in accordance with each successive change in the output condition of the scanning element for any scan path, selecting from the identified sets of output conditions, an initial set of output conditions for identifying the leading edge of each character in accordance with at least one of said intermediate scan path output conditions identifying the presence of the respectively corresponding vertical segment therein, in the scan of said commonly oriented vertical portion of the character, selecting a successive set of output conditions for identifying a central portion of each character in accordance with at least one of said horizontal scan path output conditions identifying the presence of the respectively corresponding horizontal segment therein and said intermediate scan path conditions identifying the absence of any vertical segment therein, and selecting a final set of output conditions for identifying the trailing edge of each character in accordance with the intermediate scan path output conditions subsequent to the selected set of central output conditions, the selected sets in the prescribed sequences of leading edge, central, and trailing edge sets of conditions uniquely identifying respectively corresponding characters of the class, and scanning a character to be recognized in accordance with said horizontal scan paths and achieving recognition of the scanned character in accordance with the detection of a succession of said selected sets of output conditions in one of said prescribed sequences.

2. A method of character recognition as recited in claim 1, further comprising:

defining an index condition comprising the set of output conditions corresponding to the absence of any character segment in any scan path, and responding to the index condition to distinguish between successive characters being scanned.

3. A method of character recognition as recited in claim 1, further comprising:

defining an index condition comprising the set of output conditions corresponding to the absence of any character segment in any scan path, and responding to the index condition to identify completion of scanning of a character.

4. A method of character recognition as recited in claim 3, further comprising:

for each character having no vertical segment at the trailing edge thereof, selecting as the trailing edge set of output conditions, the output conditions of said intermediate scan paths identifying the absence of character segments therein, and the index condition.

5. A method of character recognition as recited in claim 1, wherein the class of characters is defined by a seven segment, generally rectangular font of upper and lower left vertical segments, upper and lower right vertical segments, and said upper, middle and lower horizontal segments.

6. A method of character recognition for characters of a class having a font style of substantially straight line segments including upper and lower vertical segment positions and upper, middle, and lower horizontal segment positions, wherein each character to be recognized is scanned in a plurality of horizontal scan paths including at least two scan paths aligned with said horizontal segment positions and two scan paths respectively intermediate the upper and middle, and the middle and lower horizontal segment positions to produce output conditions identifying the presence or absence of a character segment in each of the scan paths, each differing combination of simultaneously occurring scan path output conditions defining a respectively corresponding set of output conditions and wherein each character of the class includes at least one vertical segment at a commonly disposed vertical position thereof defining the leading edge of each character and determining thereby the direction of scan of the characters, the leading edge thereby being scanned in at least one of said intermediate paths, comprising:

scanning each character to be recognized in the predetermined direction to produce a succession of sets of output conditions of said scan paths in accordance with the output condition of any scan path changing during the scanning of the character, responding to the output conditions of the intermediate scan paths in each of said succession of sets and decoding said intermediate scan path output conditions in accordance with selected sets thereof corresponding to leading edges of the characters of the class, responding to the output conditions of at least two of the upper, middle and lower scan paths, in each of said succession of sets, and decoding said upper, middle, and lower scan path output conditions in accordance with selected sets thereof corresponding to scanning of central portions of the characters of the class, responding to the output conditions of the intermediate scan paths in each of said succession of sets and decoding said intermediate scan path output conditions in accordance with selected sets thereof corresponding to trailing edges of the characters of the class, establishing prescribed sequences of leading edge, central, and trailing edge sets of conditions uniquely identifying each character of the class to be recognized, and processing the decoded, selected sets of output conditions derived in scanning a character in accordance with the prescribed sequences of leading edge, central, and trailing edge sets of conditions thereby to identify the unknown character being scanned as a specific character of the class.

7. A method of character recognition as recited in claim 6, further comprising:

selecting said sets of output conditions for identifying the central portion of a character to include only those sets for which no vertical segment is scanned in the intermediate scan paths.

8. A method of character recognition as recited in claim 6, further comprising:

responding to the decoded output condition identifying the leading edge of a character being scanned thereby to enable the decoding of said output conditions in accordance with the selected sets thereof corresponding to the central portions and trailing edges of the characters being scanned.

9. A method of character recognition as recited in claim 6, further comprising:

responding to the set of output conditions for all of said scan paths identifying the absence of any character segment in any scan path to define an index condition, and inhibiting the decoding of any of said output conditions during the index condition.

10. A method of character recognition as recited in claim 6, further comprising:

storing the output conditions for the intermediate scan paths corresponding to scanning of the leading edge of a scanned character, prior to decoding thereof, and enabling the decoding of the thus stored output conditions for the intermediate scan paths, only in response to the subsequent set of output conditions for the intermediate scan paths corresponding to the absence of any vertical segment therein.

11. A method of character recognition for characters of a class having a font style of substantially straight line segments including upper and lower vertical segment positions and upper, middle, and lower horizontal segment positions, wherein each character to be recognized is scanned in a plurality of horizontal scan paths including at least two scan paths aligned with said horizontal segment positions and two scan paths respectively intermediate the upper and middle, and the middle and lower horizontal segment positions to produce output conditions identifying the presence or absence of a character segment in each of the scan paths, each differing combination of simultaneously occurring scan path output conditions defining a respectively corresponding set of output conditions and wherein each character of the class includes at least one vertical segment at a commonly disposed vertical position thereof defining the leading edge of each character and determining thereby the direction of scan of the characters, the leading edge thereby being scanned in at least one of said intermediate paths, comprising:

scanning each character to be recognized in said predetermined direction to produce initial and successive sets of output conditions in accordance with each change in the output condition of any scan path, and resulting in a change in the set of output conditions during the scanning of the character, decoding the output conditions for said intermediate scan paths in accordance with sets thereof selected to identify a set of leading edge conditions and a set of trailing edge conditions, as produced in scanning of each character to be recognized, decoding the output conditions for at least two of said upper, middle, and lower scan paths in accordance with sets thereof selected to identify a set of conditions corresponding to a central portion of each character and wherein the intermediate scan path conditions identify the absence of any vertical segments, as produced in scanning of each character to be recognized, and processing the thus identified, preselected sets of conditions in accordance with a prescribed sequence of leading, central, and trailing edge conditions to achieve recognition of the character of the class uniquely identified thereby.

12. A character recognition system for recognizing characters of a class having a font style of substantially straight line segments including upper and lower vertical segment positions and upper, middle, and lower horizontal segment positions, wherein each character to be recognized is scanned in a plurality of horizontal scan paths including at least two scan paths aligned with said horizontal segment positions and two scan paths respectively intermediate the upper and middle, and the middle and lower horizontal segment positions to produce output conditions identifying the presence or absence of a character segment in each of the scan paths, each differing combination of simultaneously occurring scan path output conditions defining a respectively corresponding set of output conditions and wherein each character of the class includes at least one vertical segment at a commonly disposed vertical position thereof defining the leading edge of each character and determining thereby the direction of scan of the characters, the leading edge thereby being scanned in at least one of said intermediate paths, comprising:

means for scanning each character to be recognized in the predetermined direction to produce a succession of sets of output conditions of said scan paths in accordance with the output condition of any scan path changing during the scanning of the character, decoding means responsive to the output conditions of the intermediate scan paths in each of said succession of sets for decoding said output conditions in accordance with selected sets thereof corresponding to leading and trailing edges of the characters of the class, and producing outputs identifying the sets of output conditions decoded thereby in response to the output conditions produced in scanning the leading and trailing edges, respectively, of each character, further decoding means responsive to the output conditions of at least two of the upper, middle, and lower scan paths in each of said succession of sets for decoding said output conditions in accordance with selected sets thereof corresponding to the central portion of each character of the class, and producing an output identifying the set of output conditions decoded thereby in response to the output conditions produced in scanning the central portion of each character, and logic recognition means defining prescribed sequences of leading edge, central, and trailing edge selected sets of conditions uniquely identifying each character of the class, and responsive to the outputs of said decoding means in scanning of each unknown character to identify the character in accordance with the sets of conditions identified by the decoded outputs of said decoding means and corresponding to one of said prescribed sequences.

13. A character recognition system as recited in claim 12, wherein said further decoding means for identifying the central portion of a character is responsive only to those sets of output conditions corresponding to the absence of a vertical segment in the intermediate scan paths.

14. A character recognition system as recited in claim 12, further comprising:

means responsive to the output of said decoding means identifying a decoded selected set of conditions corresponding to the leading edge of a character being scanned, for producing an enabling signal, and said decoding means for the central and trailing edge sets of conditions being normally disabled, and being responsive to the enabling signal output of said enabling signal means for producing outputs identifying the decoded, selected sets of conditions for the leading and trailing edges of a character being scanned.

15. A character recognition system as recited in claim 14, further comprising:

indexing means responsive to the output conditions for all of said scan paths and operative in response to all of said output conditions corresponding to the absence of any character segment in all of said corresponding scan paths to produce an output identifying an index condition, and said decoding means for the leading edge set of conditions being disabled in response to the index condition output of said indexing means from decoding the output conditions of said intermediate scan paths.

16. A character recognition system as recited in claim 12, wherein said leading/trailing edge decoding means further comprises:

means for storing the output conditions derived for the intermediate scan paths in scanning of a character, said decoding means for said leading and said trailing edge sets of condition being responsive to said stored output conditions for decoding thereof in producing said outputs identifying the leading and trailing edges, respectively, of each character, and means responsive to the output conditions of the intermediate scan paths for disabling said leading and trailing edge decoding means when said intermediate scan path output conditions identify the presence of a vertical segment in either of said intermediate scan paths and for enabling said leading and trailing edge decoding means when said intermediate scan path output conditions correspond to the absence of a vertical segment in both of said intermediate scan paths.

17. A character recognition system for recognizing characters of a class having a font style of substantially straight line segments including upper and lower vertical segment positions and upper, middle, and lower horizontal segment positions, wherein each character to be recognized is scanned in a plurality of horizontal scan paths including at least two scan paths aligned with said horizontal segment positions and two scan paths respectively intermediate the upper and middle, and the middle and lower horizontal segment positions to produce output conditions identifying the presence or absence of a character segment in each of the scan paths, each differing combination of simultaneously occurring scan path output conditions defining a respectively corresponding set of output conditions and wherein each character of the class includes at least one vertical segment at a commonly disposed vertical portion thereof defining the leading edge of each character and determining thereby the direction of scan of the characters, the leading edge thereby being scanned in at least one of said intermediate paths, comprising:

leading/trailing edge output condition storage means for storing the output conditions of the intermediate scan paths in scanning of a character, leading/trailing edge decoding means responsive to the stored output conditions of the intermediate scan paths of said storing means for decoding thereof in accordance with sets of said intermediate scan path output conditions selected for identifying the leading and trailing edges of the characters of the class and producing outputs identifying the sets thus decoded in scanning the leading and trailing edges of each character, leading edge storage means for storing the output of said leading/trailing edge decoding means identifying the decoded and selected set of conditions for the leading edge of a character being scanned, control means responsive to the identification of a leading edge selected set of conditions from said leading edge storage means to produce an enabling signal, input gate means for said leading edge storage means normally enabled to supply the decoded output of said leading/trailing edge decoding means to said leading edge storage means and responsive to the output of said control means to be disabled thereby, said leading edge storage means thereby maintaining the stored and decoded selected set of conditions derived in scanning the leading edge of a character throughout the duration of scanning of that character, central portion output condition storage means for storing the output conditions of the scan paths for the upper, middle and lower horizontal segments, gate means for said central portion storage means responsive to said enabling signal output of said control means for being enabled to supply the output conditions derived in scanning a central portion of the character to said central portion output condition storage means for storage therein, central portion decoding means responsive to the stored central portion output conditions in accordance with selected sets thereof and producing an output identifying the decoded selected set of output conditions derived in scanning the central portion of a character, trailing edge gating means enabled by the enabling output of said control means and responsive to the outputs of said leading/trailing edge decoding means corresponding to scanning of a trailing edge of a character to produce an output identifying the decoded selected set of trailing edge conditions for a character being scanned, and logic recognition means defining prescribed sequences of leading edge, central and trailing edge selected sets of conditions uniquely identifying each character of the class, and responsive to the outputs of said leading edge storage means, and said central and said trailing edge decoding means produced in scanning each unknown character, to identify the character in accordance with the decoded, selected sets of conditions identified by the outputs of said decoding means and corresponding to one of said prescribed sequences.

18. A character recognition system as recited in claim 17, further comprising:

means responsive to the enabling output of said control means upon the identification of a decoded selected set of leading edge conditions, for clearing said leading/trailing edge storage means in preparation for storing of the output conditions of said intermediate scan paths resultant from scanning of a trailing edge of a character.

19. A character recognition system as recited in claim 17, further comprising:

inhibit means responsive to the output conditions of the intermediate scan paths for producing an inhibit signal when said output conditions correspond to the presence of a vertical segment in either of said intermediate scan paths, and to produce an enable output when said output conditions correspond to the absence of a vertical segment in both of said intermediate scan paths, and said leading/trailing edge decoding means further being responsive to the inhibit and enable outputs of said inhibit means for being correspondingly inhibited from, and enabled for, decoding of the stored output conditions of said leading/trailing edge storage means.

20. A character recognition system as recited in claim 17, further comprising:

indexing means responsive to the output conditions for all of said scan paths and operative in response to all of said output conditions corresponding to the absence of any character segment in all of said corresponding scan paths to produce an output identifying an index condition, and input gating means for supplying and leading/trailing edge output conditions to said storage means therefor, said input gating means being disabled in response to the index condition output of said indexing means for inhibiting gating of said output conditions to said storage means.

21. A character recognition system as recited in claim 20, wherein each of said storage means is responsive to the index output condition of said indexing means for reset thereof to a cleared state.

* * * * *